United States Patent
Oisha et al.

(10) Patent No.: US 10,698,289 B2
(45) Date of Patent: Jun. 30, 2020

(54) OPTICAL MODULATOR

(71) Applicant: Sumitomo Osaka Cement Co., Ltd., Tokyo (JP)

(72) Inventors: Kenta Oisha, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/367,738

(22) Filed: Mar. 28, 2019

(65) Prior Publication Data
US 2019/0302566 A1 Oct. 3, 2019

(30) Foreign Application Priority Data
Mar. 29, 2018 (JP) .................................. 2018-064252

(51) Int. Cl.
*G02F 1/035* (2006.01)
*G02F 1/225* (2006.01)
*G02F 1/21* (2006.01)

(52) U.S. Cl.
CPC ...... *G02F 1/2255* (2013.01); *G02F 2001/212* (2013.01)

(58) Field of Classification Search
CPC .................... G02F 1/2255; G02F 2001/212
See application file for complete search history.

(56) References Cited

U.S. PATENT DOCUMENTS

| | | | | |
|---|---|---|---|---|
| 5,748,358 A * | 5/1998 | Sugamata | ............. | G02F 1/0356 359/245 |
| 5,841,568 A | 11/1998 | Miyakawa | | |
| 7,751,656 B2 * | 7/2010 | Sugiyama | ............. | G02F 1/2255 359/251 |
| 7,809,218 B2 * | 10/2010 | Iwata | .................... | G02F 1/0356 385/1 |
| 2002/0146190 A1 * | 10/2002 | Doi | ........................ | G02F 1/2255 385/14 |
| 2005/0013522 A1 * | 1/2005 | Doi | ........................ | G02F 1/0121 385/3 |

* cited by examiner

*Primary Examiner* — Ellen E Kim
(74) *Attorney, Agent, or Firm* — IpHorgan Ltd.

(57) ABSTRACT

An optical modulator having a substrate having an electro-optic effect, an optical waveguide formed in the substrate, and a signal electrode and ground electrodes formed on the substrate so as to interpose the optical waveguide, in which the signal electrode and the ground electrodes respectively have a plurality of electrode layers, and an interval between the signal electrode and the ground electrode is larger than a mode field diameter of the optical waveguide in a first layer of the electrode layers closest to the substrate and is smaller than the interval in the first layer of the electrode layers in at least any one of second and upper layers of the electrode layers.

3 Claims, 4 Drawing Sheets

OPTICAL MODULATOR

CROSS-REFERENCE TO RELATED APPLICATIONS

This application claims the benefit of Japanese Patent Application No. 2018-064252 filed Mar. 29, 2018, the disclosure of which is herein incorporated by reference in its entirety.

BACKGROUND OF THE INVENTION

Field of the Invention

The present invention relates to an optical modulator having a substrate having an electro-optic effect, an optical waveguide formed in the substrate, and a signal electrode and ground electrodes formed on the substrate so as to interpose the optical waveguide.

Description of Related Art

In the fields of optical communication and the like, optical modulators that modulate and output input light waves are being used. A schematic structure of an optical modulator will be described with reference to FIG. 1. FIG. 1A is a plan view showing the schematic structure of the optical modulator. FIG. 1B is a cross-sectional view along a line I-I in FIG. 1A. As shown in these drawings, the optical modulator has a substrate 1 having an electro-optic effect, an optical waveguide 2 formed in the substrate 1, and electrodes for control for controlling light waves that propagate along the optical waveguide 2. Meanwhile, FIG. 1C shows a cross-sectional view along the line I-I in a case where a thickness of the substrate is thin (10 µm or less) in FIG. 1A.

The optical waveguide 2 is configured to include a Mach-Zehnder-type waveguide having a Mach-Zehnder interferometer structure. The electrodes for control are configured of a signal electrode 3 disposed between individual arm portions of the Mach-Zehnder-type waveguide and ground electrodes 4 respectively disposed outside the respective arm portions. The optical modulator controls light waves that propagate along the optical waveguide 2 using an electric field that is generated by the application of control signals (for example, high-frequency signals) to the signal electrode 3. In a case where the thickness of the substrate 1 is thin, as shown in FIG. 1C, the substrate 1 is stuck to a supporting substrate 6 through an adhesive layer 5. As the supporting substrate, for example, an LN substrate is used.

In the related art, in order to realize the improvement of the characteristics of optical modulators, high-frequency transmission rates, or the like, a variety of inventions have been proposed. For example, Patent Document 1 relates to an optical modulator having a substrate having an electro-optic effect, an optical waveguide formed in the substrate, and an electrode for control formed on the substrate in harmony with the optical waveguide and discloses a structure in which the electrodes for control are formed in multiple layers in a thickness direction.

In a case where a material having a strong electro-optical effect in a horizontal direction of a cross section of the substrate, for example, an LN substrate of an X plate is used, in order to efficiently carry out optical control, it is desirable to decrease the interval between a signal electrode and a ground electrode by disposing the signal electrode and the ground electrode near an optical waveguide. However, when the electrodes are excessively close to the optical waveguide (or the electrodes overlap the optical waveguide), the absorption of light waves that propagate along the optical waveguide into the electrodes generates an optical loss. Therefore, the generation of the optical loss has been avoided by forming a buffer layer (for example, a 0.5 to 1.5 µm $SiO_2$ film). However, the formation of the buffer layer decreases the electric field efficiency, and thus it is necessary to increase the lengths of the electrodes (action length), which brings about an obstacle in the size reduction of optical modulators and the design of wider bandwidths. Therefore, there has been a demand for additional improvement in the structure of an electrode formed on a substrate of an optical modulator.

[Patent Document 1] Japanese Laid-open Patent Publication No. 8-271844

SUMMARY OF THE INVENTION

An object that the present invention intends to achieve is to solve the above-described problem and provide an optical modulator in which absorption of light waves that propagate along an optical waveguide into an electrode is suppressed and efficient optical control can be carried out.

In order to achieve the above-described object, an optical modulator of the present invention has the following technical characteristics.

(1) An optical modulator having a substrate having an electro-optic effect, an optical waveguide formed in the substrate, and a signal electrode and ground electrodes formed on the substrate so as to interpose the optical waveguide, in which the signal electrode and the ground electrodes respectively have a plurality of electrode layers, and an interval between the signal electrode and the ground electrode is larger than a mode field diameter of the optical waveguide in a first layer of the electrode layers closest to the substrate and is smaller than the interval in the first layer of the electrode layers in at least any one of second and upper layers of the electrode layers.

(2) The optical modulator according to (1), in which, in the signal electrode and the ground electrodes, the first layers are formed of a first metal, and at least any one of the second and upper layers are formed of a second metal that is different from the first metal.

(3) The optical modulator according to (1) or (2), in which, in the signal electrode and the ground electrodes, the first layers are formed to be 0.5 µm or less in thickness.

According to the present invention, the interval between the signal electrode and the ground electrode is larger than the mode field diameter of the optical waveguide in the first layer of the electrode layer closest to the substrate and is smaller than the interval in the first layer of the electrode layers in at least any one of the second and upper layers of the electrode layers, and thus it is possible to provide an optical modulator in which the absorption of light waves that propagate along the optical waveguide into the electrode is suppressed and efficient optical control can be carried out.

DETAILED DESCRIPTION OF THE INVENTION

Figure 1A:
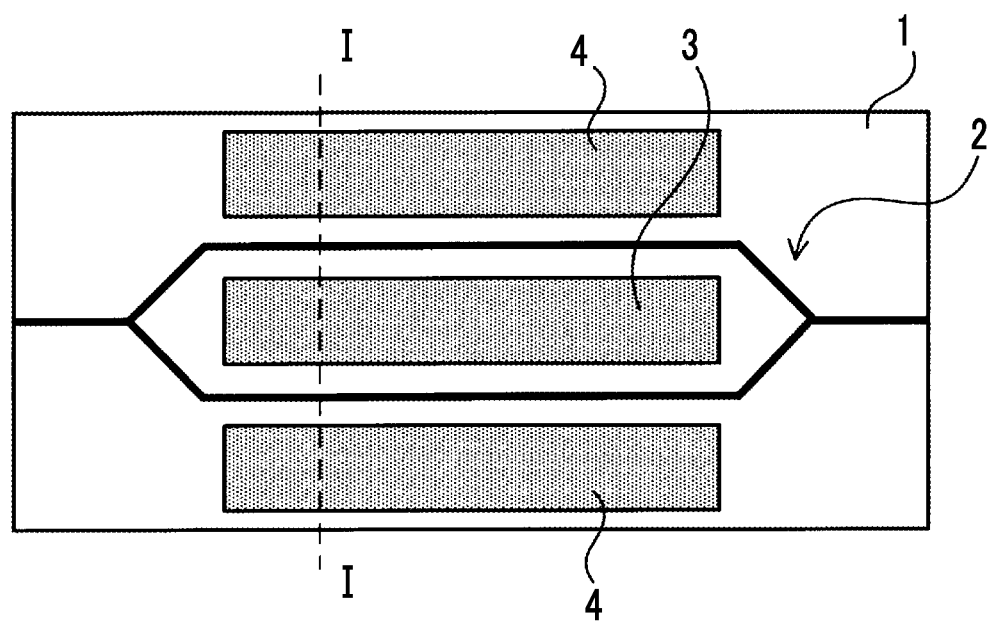
FIG. 1A is a plan view showing a schematic structure of an optical modulator.
Figure 1B:
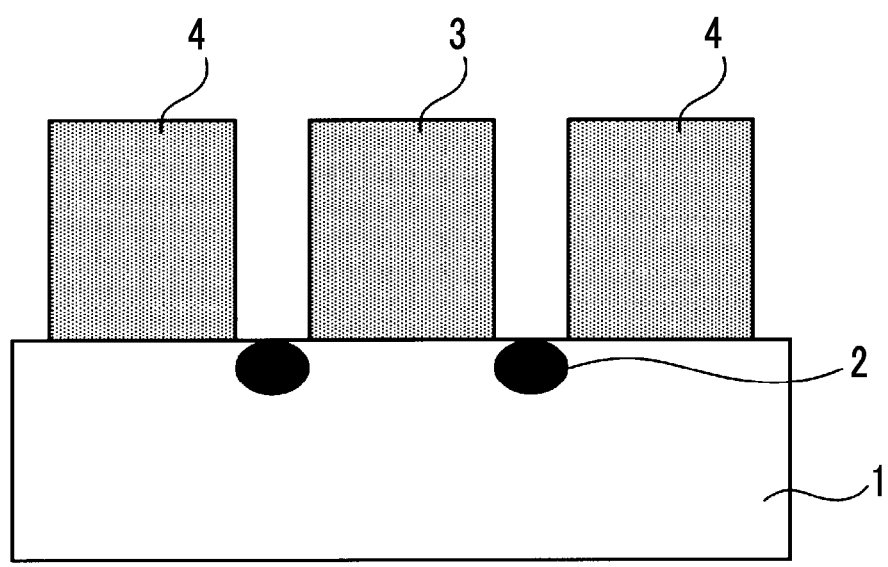
FIG. 1B is a cross-sectional view along a line I-I in FIG. 1A.
Figure 1C:
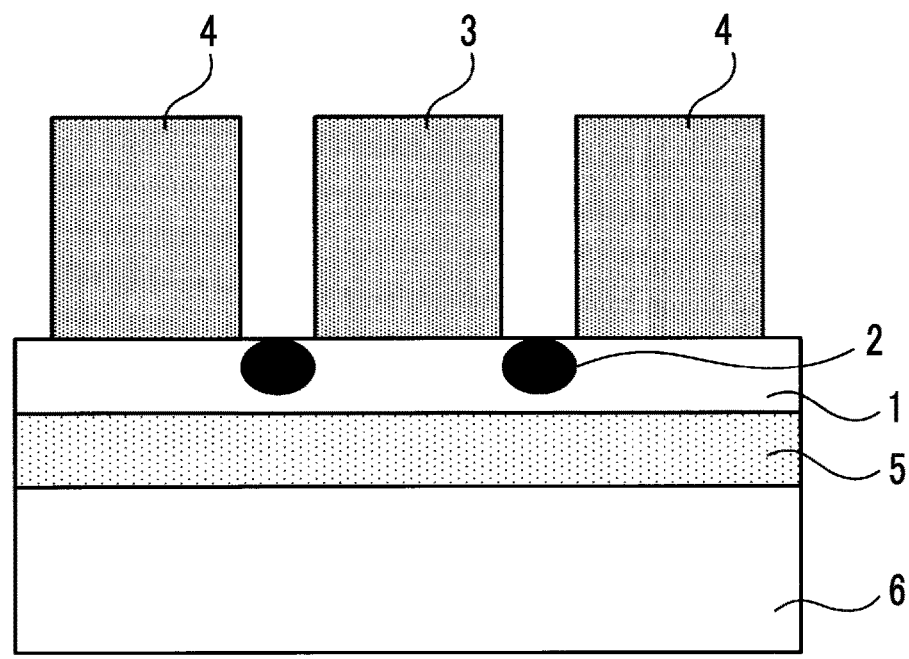
FIG. 1C is a cross-sectional view along the line I-I in a case where a thickness of a substrate is thin in FIG. 1A.
Figure 2:
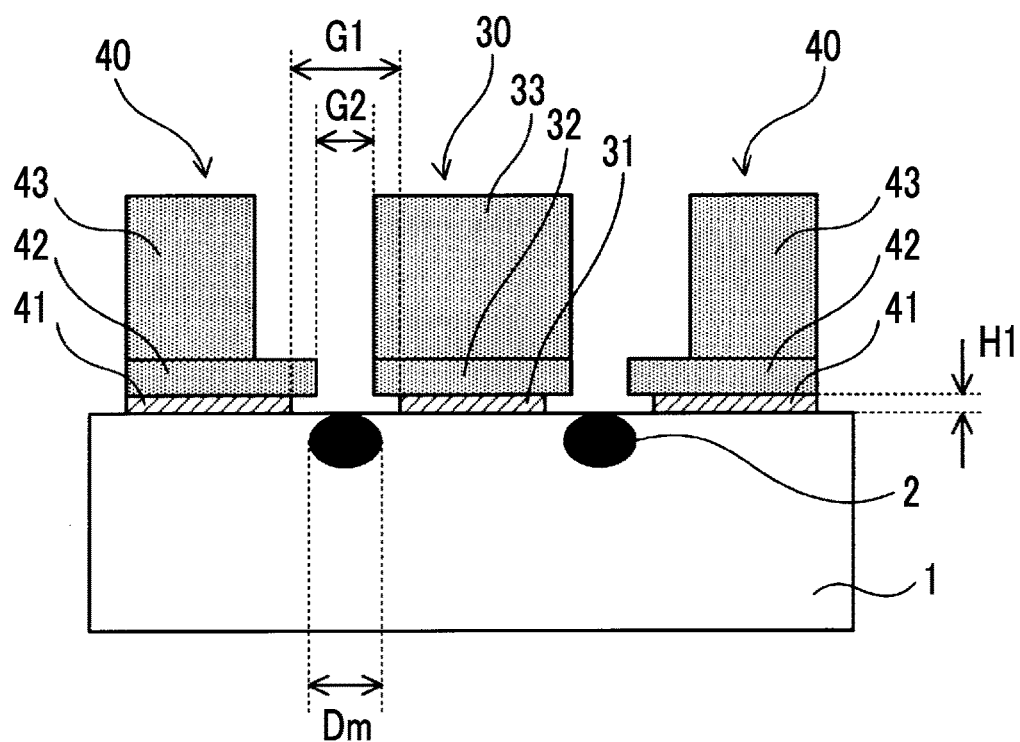
FIG. 2 is a cross-sectional view showing an example of an optical modulator according to an embodiment of the present invention.

An optical modulator according to the present invention will be described in detail using preferred examples. Meanwhile, the present invention is not limited by the examples described below. In the following description, a configuration in which a thick substrate as shown in FIG. 1B is used as a substrate in which an optical waveguide is formed will be described, but the present invention can also be applied to a configuration in which a thin substrate as shown in FIG. 1C is used. The optical modulator of the present invention is an optical modulator having, as shown in FIG. 2, a substrate 1 having an electro-optic effect, an optical waveguide 2 formed in the substrate, and a signal electrode 30 and ground electrodes 40 formed on the substrate so as to interpose the optical waveguide, in which the signal electrode and the ground electrodes respectively have a plurality of electrode layers, and an interval between the signal electrode and the ground electrode is larger than a mode field diameter of the optical waveguide in a first layer of electrode layers closest to the substrate and is smaller than the interval in the first layer of the electrode layers in at least any one of second and upper layers of the electrode layers. Dm in FIG. 2 represents a mode field diameter in the horizontal direction of the cross section and represents a width that becomes 1/e^2 from a point at which the light intensity is maximized.

As the substrate 1 having an electro-optic effect, it is possible to use, for example, an LN substrate formed of lithium niobate. In addition, as a substrate formed of lithium tantalate, a substrate formed of lead lanthan zirconate titanate or the like may be used.

In the substrate 1, the optical waveguide 2 that propagates light waves is formed. The optical waveguide 2 is formed by, for example, thermally diffusing a high-refractive index substance such as titanium (Ti) or the like on an LN substrate. The optical waveguide 2 can be configured to include a Mach-Zehnder-type optical waveguide having a Mach-Zehnder interferometer structure. In addition, the optical waveguide 2 may be configured to include multiple Mach-Zehnder-type optical waveguides in a nested type.

On the substrate 1, furthermore, electrodes for control for controlling light waves that propagate along the optical waveguide 2 are disposed. The electrodes for control are configured of the signal electrode 30 and the ground electrodes 40 that are disposed so as to interpose the optical waveguide 2. In the present example in which the Mach-Zehnder-type waveguide is used, the signal electrode 30 is disposed between arm portions of the Mach-Zehnder-type optical waveguide, and the ground electrodes 40 are respectively disposed outside the respective arm portions. The optical modulator controls light waves that propagate along the optical waveguide 2 using an electric field that is generated by applying control signals (for example, high-frequency signals) to the signal electrode 30.

These electrodes for control respectively have a plurality of electrode layers. In FIG. 2, the signal electrode 30 is configured of three layers of electrode layers 31 to 33, and the ground electrode 40 is also configured of three layers of electrode layers 41 to 43. Meanwhile, the number of layers of the electrode layers is arbitrary and may be two or may be four or more. In the following description, the respective electrode layers will be differentiated by sequentially referring to the electrode layers as a first layer, a second layer, and a third layer from the surface of the substrate.

The electrode layers 31 and 41 in the first layer closest to the surface of the substrate are formed to be as far from the optical waveguide 2 as possible. More specifically, the electrode layers 31 and 41 in the first layer are formed so that an interval G1 between the electrodes becomes larger than the mode field diameter Dm of the optical waveguide 2 (that is, Dm<G1). The electrode layers 32 and 42 in the second layer are formed to be as close to the optical waveguide 2 as possible. More specifically, the electrode layers 32 and 42 in the second layer are formed so that an interval G2 between the electrodes becomes smaller than the interval G1 between the signal electrode and the ground electrode for the first layers (that is, G2<G1). The electrode layers 33 and 43 in the third layer are formed so that an interval between the electrodes becomes wide to a certain extent (for example, approximately twice the interval G2 between the electrodes in the second layer).

According to the above-described configuration, the first layers are formed to be apart from the optical waveguide, and thus it is possible to suppress the absorption of light waves that propagate along the optical waveguide into the electrodes for control. In addition, the second layers are formed to be close to the optical waveguide, and thus it is possible to efficiently exert an electric field that is generated from the electrodes for control on light waves that propagate along the optical waveguide. Therefore, it becomes possible to efficiently carry out optical control. In addition, the electrode interval in the third layer is made to be wider than that in the second layer, whereby it is possible to decrease the conductor loss of the electrodes and widen modulation bandwidths. In addition, the impedances of the electrodes or the propagation rates of electric signals can be adjusted by changing the intervals between the respective electrode layers, and thus it is possible to realize a structure in which an electric loss is decreased by thickening electrodes without deteriorating high-frequency characteristics.

In order to increase the efficiency of the optical control, it is preferable to form the first layers to be as thin as possible and form the second layers, which highly contribute to the optical control, to be close to the optical waveguide. In the present example, the first layers, the second layers, and the third layers are respectively formed to be approximately 0.1 μm, approximately 5 μm, and approximately 40 m in thickness, but the first layers are preferably formed to be 0.5 μm or less in thickness. The third layers are preferably formed to be approximately 30 m to 80 μm in thickness since it is possible to decrease the electric loss by thickening the third layers.

In addition, in the present example, the first layers are formed of titanium (Ti), and the second and upper layers are formed of gold (Au). The first layers are formed of titanium (Ti), whereby it is possible to ensure the adhesiveness between the substrate and the gold (Au) of the second layers. In addition, the electrode widths in the first layer can be controlled by carrying out wet etching which is capable of selectively etching electrodes.

A material for the first layers is not particularly limited as long as it is possible to ensure the adhesiveness between the substrate and gold (Au) of the second layers, but titanium (Ti), chromium (Cr), nickel (Ni), and aluminum (Al) are preferably used. An electrode material for the second and upper layers are not particularly limited as long as the material is capable of suppressing the electric loss and has a low conductivity, but gold (Au), silver (Ag), and copper (Cu) are preferably used.

The thicknesses of the first layers are preferably 50 nm to 200 nm in order to suppress the absorption of light waves that propagate along the optical waveguide. In addition, the interval G1 between the electrodes in the first layer of the electrode layers and the interval G2 between the electrodes in the second layer of the electrode layers preferably satisfy the following (condition 1) to (condition 3). (Condition 1) G1>G2, (condition 2) G1/Dm is 1.2 to 1.8, and (condition 3) G2/Dm is 1.0 to 1.6.

Figure 3:
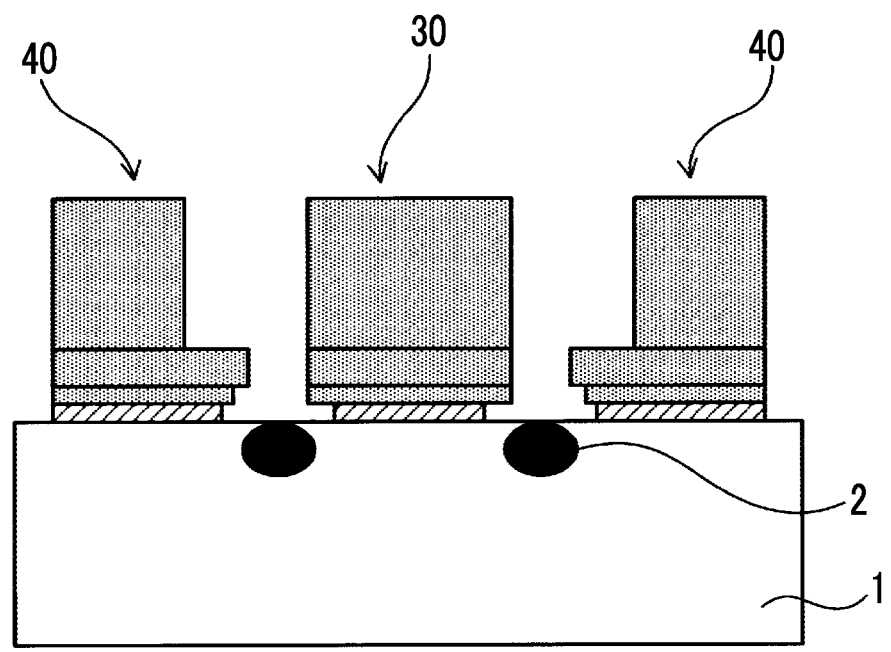
FIG. 3 is a cross-sectional view showing a modification example of the optical modulator according to the embodiment of the present invention.

Here, in the above description, among the second and upper layers of the electrode layers, the electrode interval is made to be smaller in the second layer of the electrode layers closest to the surface of the substrate than the electrode interval in the first layer of the electrode layers, but the electrode intervals may be made to be smaller in the third and upper layers of the electrode layers than the electrode interval in the first layer of the electrode layers. In a modification example shown in FIG. 3, the electrode interval is made to be smaller in the third layer of the electrode layers than the electrode interval in the first layer of the electrode layers.

Figure 4:
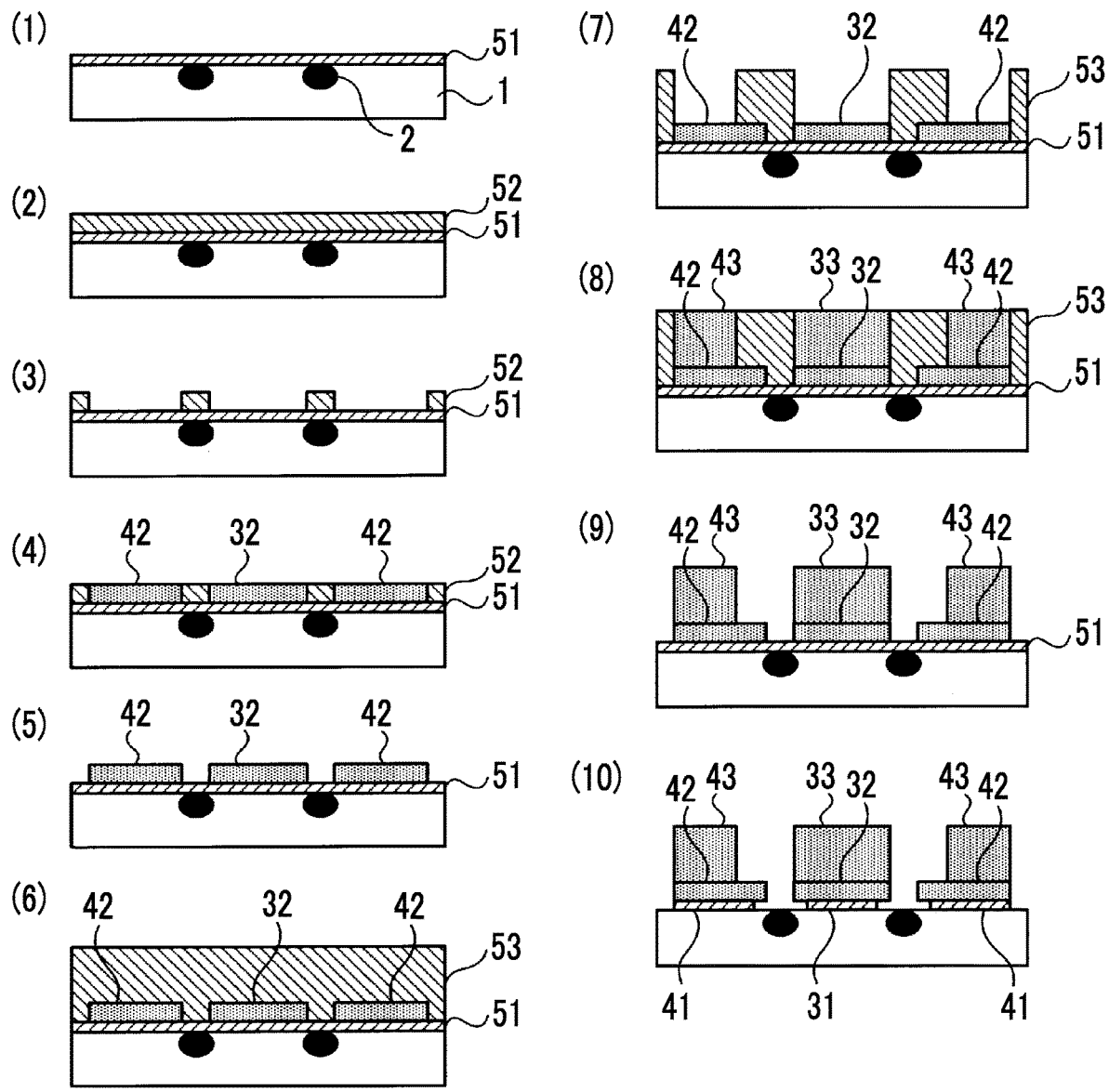
FIG. 4 is a view describing a step of forming electrodes that are used in an optical modulator according to an embodiment of the present invention.

FIG. 4 is a view describing a step of forming electrodes that are used in an optical modulator according to an embodiment of the present invention. (1) A first layer of a metal film 51 is deposited on the substrate 1 in which the optical waveguide 2 is formed. The electrode film 51 in the first layer is, for example, a titanium (Ti) film having a thickness of approximately 100 nm. (2) A second layer of a photoresist film 52 is formed on the first layer of the metal film 51 by spin coating. (3) A resist pattern is formed in the second layer of the photoresist film 52 by photolithography. (4) The second layers of the electrode layers 32 and 42 are formed using an electric field plating method. (5) The second layer of the photoresist film 52 is removed using a peeling liquid.

(6) A third layer of a photoresist film 53 is formed on the second layer of the electrode layers 32 and 42 (and the photoresist film 52) by spin coating. (7) A resist pattern is formed in the third layer of the photoresist film 53 by photolithography. (8) The third layer of the electrode layers 33 and 43 are formed using an electric field plating method. (9) The third layer of the photoresist film 53 is removed using the peeling liquid.

(10) The steps (6) to (9) are repeated until a desired number of layers are formed, the control electrodes 30 and 40 having a plurality of the electrode layers are formed on the substrate 1, then, regions other than the electrode-formed regions are removed by wet etching from the first layer of the metal film 51, and the first layer of the electrode layers 31 and 41 are formed. At this time, the electrode interval G1 in the first layer of the electrode layers is set to be smaller than the mode field diameter Dm of the optical waveguide.

With the above-described steps, it is possible to produce the control electrodes made up of a plurality of the electrode layers in which the first layer is formed of Ti and the second and upper layers are formed of Au. Furthermore, it is also possible to form the electrode layers so that the electrode interval G1 in the first layer of the electrode layers is larger than the mode field diameter Dm of the optical waveguide and the electrode interval G2 in the second layer of the electrode layers is smaller than the electrode interval G1 in the first layer of the electrode layers.

Hitherto, the present invention has been described on the basis of the examples, but the present invention is not limited to the above-described contents, and the design can be appropriately modified within the scope of the gist of the present invention.

According to the present invention, it is possible to provide an optical modulator in which absorption of light waves that propagate along an optical waveguide into an electrode is suppressed and efficient optical control can be carried out.

What is claimed is:

1. An optical modulator comprising:
    a substrate having an electro-optic effect;
    an optical waveguide formed in the substrate; and
    a signal electrode and ground electrodes formed directly on the substrate so as to interpose the optical waveguide,
    wherein the signal electrode and the ground electrodes respectively have a plurality of electrode layers, and an interval between the signal electrode and the ground electrode is larger than a mode field diameter of the optical waveguide in a first layer of the electrode layers closest to the substrate and is smaller than the interval in the first layer of the electrode layers in at least any one of second and upper layers of the electrode layers.

2. The optical modulator according to claim 1,
    wherein, in the signal electrode and the ground electrodes, the first layers are formed of a first metal, and at least any one of the second and upper layers are formed of a second metal that is different from the first metal.

3. The optical modulator according to claim 1,
    wherein, in the signal electrode and the ground electrodes, the first layers are formed to be 0.5 μm or less in thickness.

* * * * *